(12) United States Patent
Losee et al.

(10) Patent No.: US 7,372,009 B1
(45) Date of Patent: May 13, 2008

(54) SOLID-STATE THERMAL NEUTRON DETECTOR

(75) Inventors: Jon R. Losee, San Diego, CA (US); J. Charles Hicks, San Diego, CA (US); Everett W. Jacobs, San Diego, CA (US); Wayne C. McGinnis, San Diego, CA (US); Roger D. Boss, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 332 days.

(21) Appl. No.: 10/322,813

(22) Filed: Dec. 18, 2002

(51) Int. Cl.
*H01J 40/00* (2006.01)
*G01T 3/08* (2006.01)

(52) U.S. Cl. .................. 250/200; 250/370.05
(58) Field of Classification Search ........... 250/370.05, 250/390.01, 370.01, 370.12, 370.14, 200
See application file for complete search history.

(56) References Cited

U.S. PATENT DOCUMENTS

| | | | | |
|---|---|---|---|---|
| 3,728,593 | A * | 4/1973 | Coleman | 257/84 |
| 5,019,886 | A * | 5/1991 | Sato et al. | 257/429 |
| 5,216,249 | A * | 6/1993 | Jones et al. | 250/370.05 |
| 5,940,460 | A * | 8/1999 | Seidel et al. | 376/153 |
| 6,025,611 | A | 2/2000 | Dowben | |
| 6,072,181 | A * | 6/2000 | Hassard et al. | 250/370.01 |
| 6,373,062 | B1 * | 4/2002 | Ghelmansarai | 250/370.09 |
| 6,388,260 | B1 | 5/2002 | Doty et al. | |
| 6,440,786 | B1 | 8/2002 | Dowben | |
| 6,727,504 | B1 * | 4/2004 | Doty | 250/390.01 |
| 6,730,914 | B2 * | 5/2004 | Chao et al. | 250/370.14 |
| 6,771,730 | B1 * | 8/2004 | Dowben et al. | 376/155 |
| 2004/0113084 | A1 * | 6/2004 | Nakata et al. | 250/370.01 |

OTHER PUBLICATIONS

Hwang, Seong-Don et al.; Fabrication of boron-carbide/boron heterojunction devices; Applied Physics Letters, vol. 68, Mar. 11, 1996, pp. 1495-1497, USA.
Robertson, B. W.; A Class of boron-rich solid-state neutron detectors; Applied Physics Letters, vol. 80 Nr. 19, May 13, 2002pp. 3644-3646, USA.

* cited by examiner

*Primary Examiner*—David P. Porta
*Assistant Examiner*—Faye Boosalis
(74) *Attorney, Agent, or Firm*—Peter A. Lipovsky; J. Eric Anderson; Ryan J. Friedl

(57) ABSTRACT

A solid-state thermal neutron detector comprises: a layered structure that includes; an electrically insulating substrate; a first electrode affixed to the substrate; a neutron-reactive layer affixed to and in ohmic contact with the first electrode; and a second electrode affixed to and in ohmic contact with the neutron-reactive layer; a voltage source electrically coupled to the first and second electrodes; and an electrical current detector electrically coupled in series between the layered structure and the voltage source.

35 Claims, 6 Drawing Sheets

SOLID-STATE THERMAL NEUTRON DETECTOR

BACKGROUND OF THE INVENTION

Commonly used thermal neutron detectors such as gas proportional counters and scintillation counters tend to be bulky and are not readily configured for covering large areas. Gas proportional counters require high voltages, on the order of kilovolts, which can be electronically noisy and susceptible to arcing due to environmental conditions. Solid-state neutron detectors based on silicon or germanium photodiodes and phototransistors exist, but they tend to have small detection apertures, and typically require a neutron converter foil, such as Gd, in front of the semiconductor device. One class of solid-state neutron-detectors detects electron-hole pairs that cross a semiconductor junction. The electron hole pairs are produced by reaction particles formed as a result of neutron reaction within films containing neutron-sensitive material incorporated within the detector. One such solid-state neutron detector includes a silicon semiconductor having a layer doped with boron. Neutrons react with the boron-containing layer, thereby creating energetic reaction particles that, in turn, create electron-hole pairs that diffuse into and across the junction to produce a current pulse.

Boron-rich solid-state neutron detectors have been described by B. W. Robertson, et al., in Applied Physics Letters, Volume 80, No. 19, pp. 3644-3646 (May 2002). However, a significant problem with these solid-state neutron detectors is the difficulty of forming ohmic contacts to the boron compound layer, which is a semiconducting material. Examples of a boron compound include boron carbide ($B_5C$). For the above-referenced detector, intervening semiconducting layers are used between the boron carbide layer and the electrodes. However, forming multiple layers is expensive because each layer requires individual processing to create a structure that has good electrical conductance and adhesion between the multiple layers and the boron carbide layer. Also, the interface between the two semiconducting layers creates a diode structure, and thus a rectifying contact to the boron-containing layer. Such a diode structure is operated with a reverse bias voltage applied, which can lead to an unacceptably high background, or dark, current. Therefore, a need exists for a solid-state neutron detector for which low-resistance (or ohmic) contacts or electrodes may be formed directly onto the semiconducting boron-containing layer, and that operates with a low background current.

SUMMARY OF THE INVENTION

A solid-state thermal neutron detector comprises: a layered structure that includes; an electrically insulating substrate; a first electrode affixed to the substrate; a neutron-reactive layer affixed to and in ohmic contact with the first electrode; and a second electrode affixed to and in ohmic contact with the neutron-reactive layer; a voltage source electrically coupled to the first and second electrodes; and an electrical current detector electrically coupled in series between the layered structure and the voltage source.

BRIEF DESCRIPTION OF THE DRAWINGS

Throughout the several views, like elements are referenced using like references.

DESCRIPTION OF THE PREFERRED EMBODIMENT

Figure 1:
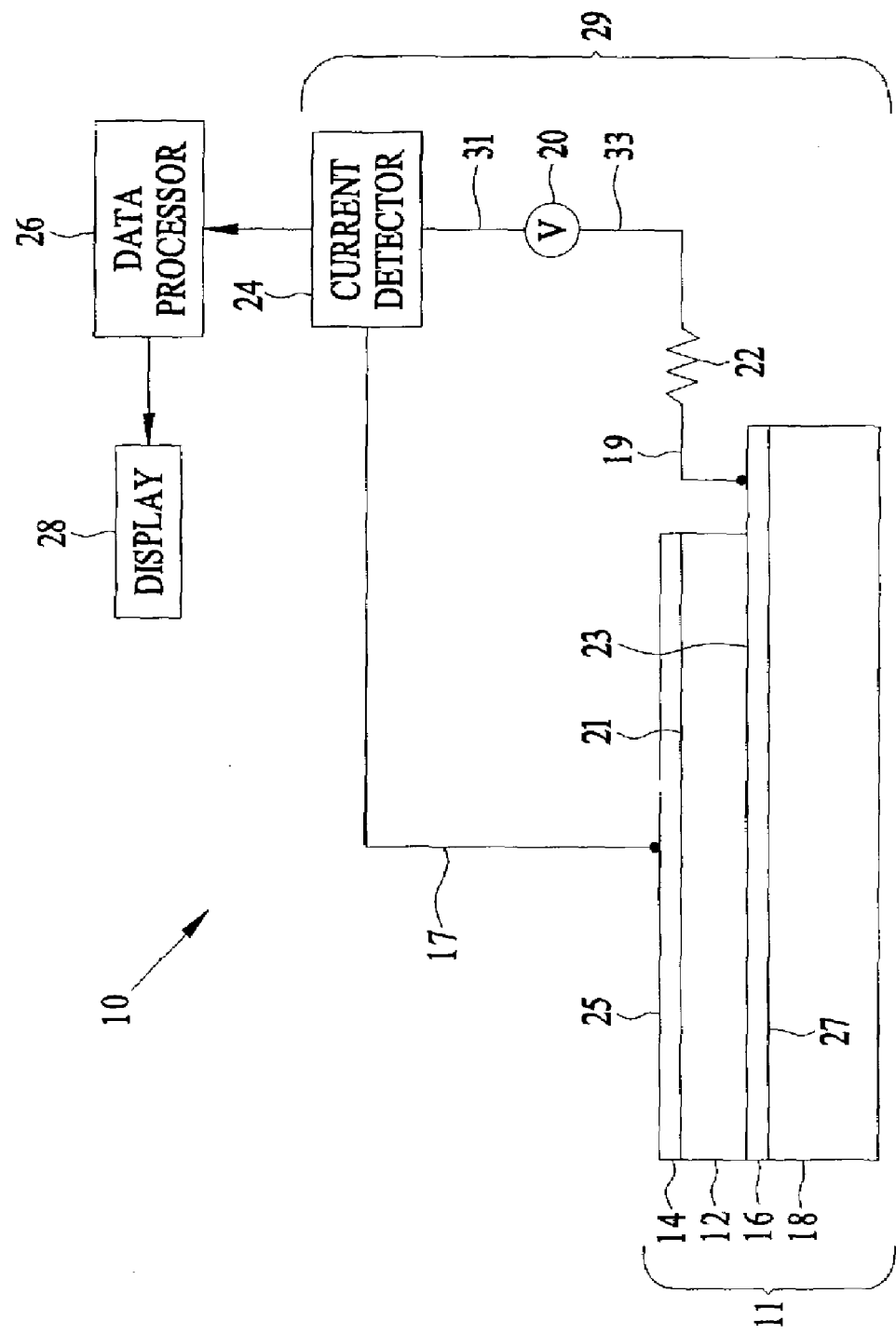
FIG. 1 shows an embodiment of a thermal neutron detector.

Referring to FIG. 1, there is shown an embodiment of a solid-state thermal neutron detector 10 that includes a layered structure 11 defined by an electrically insulating substrate 18, a first electrode 16 formed on the substrate, a neutron-reactive layer 12 affixed to the first electrode 16, and a second electrode 14 affixed to the neutron-reactive layer 12. A neutron-reactive layer is a layer in which free electron-hole pairs, or charge carriers, are created when thermal neutrons react with atoms in the layer. For example, in applications wherein neutron-reactive layer 12 consists essentially of a boron compound, the following primary reaction is believed to occur when neutrons are incident upon neutron-reactive layer 12: $n + {}^{10}B \rightarrow {}^{7}Li^* + \alpha$, where n represents a neutron, B represents a boron atom, $Li^*$ represents an excited lithium atom, and $\alpha$ represents an alpha particle (helium nucleus). The alpha particles, with an energy of about 2.3 MeV, collide with other atoms in neutron-reactive layer 12, thus generating free electron-hole pairs in neutron-reactive layer 12. Neutron-reactive layer 12 may be fabricated from materials that contain, for example, boron, gadolinium, lithium, cadmium, samarium, and/or europium, as well as from compounds containing these chemical elements, such as boron nitride, gadolinium oxide, and lithium niobate. In one embodiment, neutron-reactive layer 12 may consist essentially of an insulating (or semiconducting with high electrical resistance) boron compound, such as boron nitride.

Thermal neutron detector 10 further includes a voltage source 20 electrically coupled to the first and second electrodes 14 and 16, and an electrical current detector 24 electrically coupled in series between neutron-reactive layer 12 and voltage source 20. The material of which the electrodes are formed is selected to provide excellent electrical conductivity between each of electrodes 14, 16 and the neutron-reactive layer 12. The first and second electrodes 14, 16 may be made of materials such as metals or others that bind well and provide ohmic contact to the material comprising neutron-reactive layer 12. Such materials are identified by example further herein. For purposes of the present invention, the term "ohmic contact" means that the circuit resistance of the contact or electrode is small compared to that of the neutron-reactive layer 12 to which contact is made. Electrodes 14 and 16 are electrically coupled to current detector 24 and voltage source 20 through optional resistor 22, via electrical leads 17, 19, 31, and 33, respectively. Resistor 22 may be used to limit the current, as needed, through layered structure 11. Optionally, thermal neutron detector 10 may further include a data processor 26, and/or display 28. Processor 26 may be used to record data related to the current detected by current detector 24, such as the waveform, amplitude, and the like. Display 28 may be employed to present information regarding the current through structure 11 in a human readable format.

Figure 3:
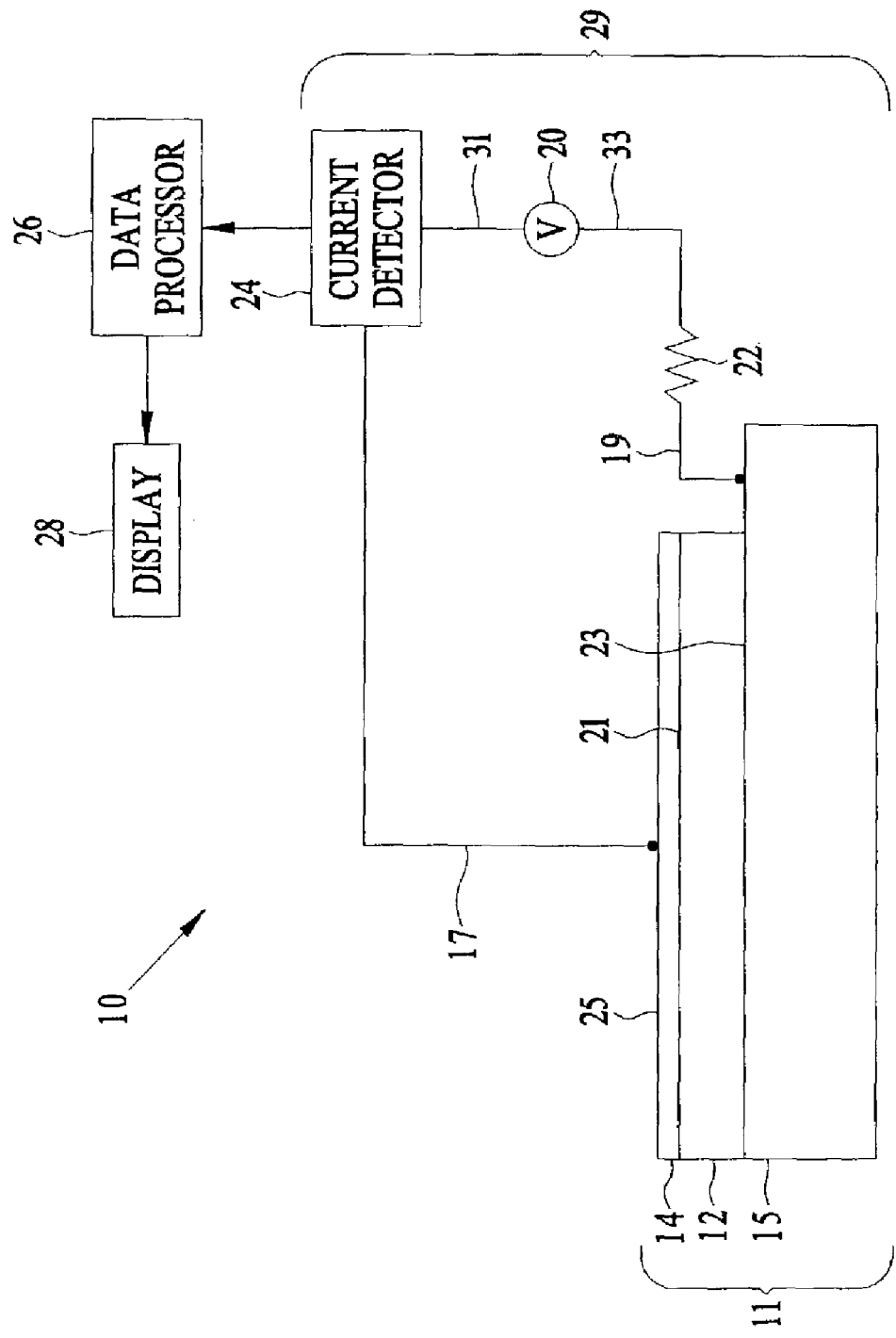
FIG. 3 shows another embodiment of a thermal neutron detector.

By way of example, substrate 18 may be made of various electrically insulating materials such as alumina, magnesium oxide, diamond, sapphire, glass, silicon, and the like. In another embodiment of a solid-state thermal neutron detector 10 as shown in FIG. 3, substrate 18 and electrode 16 may be replaced by a single layer 15 consisting essentially of an electrically conductive material, such as titanium, hafnium, zirconium, titanium nitride, hafnium nitride, or zirconium nitride, that serves as both a mechanical supporting substrate and as an electrode that provides ohmic contact to neutron-reactive layer 12.

Neutrons incident upon neutron-reactive layer 12 precipitate a nuclear reaction that creates free electron-hole pairs, or charge carriers, in that layer. Detection of such charge carriers before they recombine with each other or are captured by traps (impurities or defects) may be used to indicate the presence of a neutron in neutron-reactive layer 12. Voltage source 20 is electrically coupled to electrodes 14 and 16 to create an electric field within neutron-reactive layer 12. When a neutron is incident upon and reacts with neutron-reactive layer 12, the electric field causes the resultant free electrons or charge carriers within that layer to form a current that flows through detector circuit 29 defined by layered structure 11, current detector 24, and voltage source 20, optional resistor 22, leads 17, 19, 31, and 33. The current will either be continuous, for high neutron flux, or in the form of charge pulses for low neutron flux. The amplitude of the continuous current or the signal rate of charge pulses increases as the number of free charge carriers (electrons or holes) in neutron-reactive layer 12 increases due to an increase in the neutron flux through that layer. Optional resistor 22 controls the voltage drop across neutron-reactive layer 12. A background current, also referenced as a dark current, flows through the electrical circuit defined by layered structure 11 and voltage source 20 even if no neutrons react with neutron-reactive layer 12. Current caused by reaction of neutrons with neutron-reactive layer 12 is referenced as "excess current." Excess current is attributed to free charge carriers produced by the interaction of thermal neutrons with neutron-reactive layer 12. The amplitude of the excess current or the signal rate of the release of charge carriers (current pulses) in detector circuit 29 is proportional to the neutron flux at detector 10. The value of resistor 22 is chosen to minimize the background current while still providing an electric field within neutron-reactive layer 12 sufficient to measure the excess current generated.

In a preferred embodiment of solid-state neutron detector 10, neutron-reactive layer 12 may be manufactured so as to consist essentially of boron nitride, although other compounds containing neutron-reactive chemical elements may be employed. When neutron-reactive layer 12 is made of boron nitride (BN), the BN is preferably in a crystalline form (as for example, a polycrystalline or single-crystal form) and as defect- and impurity-free as possible. However, a single-crystal form of BN is preferred as may be approached by epitaxial growth of a BN layer on an appropriate substrate, such as diamond. Suitable crystal forms of BN include a hexagonal crystal form (h-BN), or a cubic crystal form (c-BN). Bulk polycrystalline BN generally has too many defects such as grain boundaries that may impair the ability of thermal neutron detector 10 to sense the free charge carriers before they are captured, or trapped, by the defects. Therefore, bulk polycrystalline BN is not a preferred material for neutron-reactive layer 12. When neutron-reactive layer 12 is made of boron nitride (BN), the elemental boron in the BN is typically naturally-occurring boron. Naturally-occurring boron consists of about 20% $^{10}$B and 80% $^{11}$B. The cross-section of reaction with thermal neutrons for $^{11}$B is negligible compared to that of $^{10}$B. The neutron-reactive component of BN is therefore the $^{10}$B atoms. In an alternative embodiment, neutron-reactive layer 12 may consist essentially of BN with a boron isotopic content of greater than 20 percent of $^{10}$B. In another embodiment, neutron-reactive layer 12 may have an isotopic content of 100 percent of $^{10}$B. Use of isotopically enriched BN increases the neutron detection efficiency compared to a detector made with naturally-occurring BN.

In the manufacture of solid-state neutron detector 10, neutron-reactive layer 12 may have a boron nitride thickness of about 150 μm (using naturally-occurring boron nitride). Neutron-reactive layer 12 also may be made of boron compounds other than boron nitride, as well as from non-boron compounds (including isotopically enriched compounds) that have a high cross-section of reaction with thermal neutrons, such as gadolinium oxide ($Gd_2O_3$) or lithium niobate ($LiNbO_3$). An important aspect of thermal neutron detector 10 is that there be very good electrical, i.e., ohmic, contact between the neutron-reactive layer 12 and electrodes 14 and 16. When neutron-reactive layer 12 consists essentially of boron nitride, electrodes 14, 16 may be formed of highly doped BN using standard integrated circuit processing such as sputtering, chemical vapor deposition, laser ablation, evaporation, and the like, where each electrode has a thickness of about 1 μm. Such highly doped electrodes 14 and 16 provide ohmic contact to neutron-reactive layer 12. Dopants, which may include elements such as beryllium (Be), magnesium (Mg), silicon (Si), and sulfur (S), may be added to regions near the surfaces of neutron-reactive layer 12 adjoining interfaces 21 and 23 (between neutron-reactive layer 12 and electrodes 14 and 16, respectively) during formation of neutron-reactive layer 12 using standard processing techniques. Alternatively, the dopants may be added to neutron-reactive layer 12 at interfaces 21 and 23 using standard ion implantation techniques after the neutron-reactive layer 12 has been formed. Highly doped BN is a good material choice for electrodes 14, 16 because it has excellent electrical conductivity and is compatible with crystalline boron nitride. In applications wherein electrodes 14 and 16 consist essentially of highly doped BN, the dopant concentration of the electrodes may be uniform throughout the thickness of each electrode, or may vary through the thickness of each electrode. For example, the dopant concentration in electrodes 14 and 16 may increase from a minimum (or zero) level at electrode surfaces 25 and 27 to a maximum level at interfaces 21 and 23 (i.e., gradient doping). Such dopant concentrations may be in the range of about $10^{13}$ to $10^{20}$ dopant atoms per $cm^3$ (chosen so as to produce ohmic electrical contact to neutron-reactive layer 12 with as low a contact resistance as possible).

Titanium is also particularly well suited as a material from which first and second electrodes 14 and 16 may be manufactured. Titanium forms compounds that both bond well to boron nitride and provide ohmic contact between the titanium and the boron nitride. Titanium compound formation occurs when the titanium is placed in contact with boron nitride and is heated to temperatures between about 500° C. and 1000° C. in an inert atmosphere or in vacuum. Thus, the use of titanium as a material from which electrodes 14 and 16 may be made obviates the need for specifically fabricated material layers between the electrodes 14 and 16 and neutron-reactive layer 12. Other examples of suitable electrode materials might include a reactive metal such as zirconium, hafnium, or other metals that react with BN to form conducting nitrides or borides. In another embodiment, electrodes 14,16 may consist essentially of an electrically conducting metal nitride compounds such as zirconium nitride, titanium nitride, or hafnium nitride. In another embodiment, wherein electrodes 14 and 16 are made of a reactive metal such as described above, electrodes 14 and 16 may be combined with a metal nitride, or with a highly-doped BN electrode, that is in contact with the neutron-reactive BN layer 12.

Figure 2:
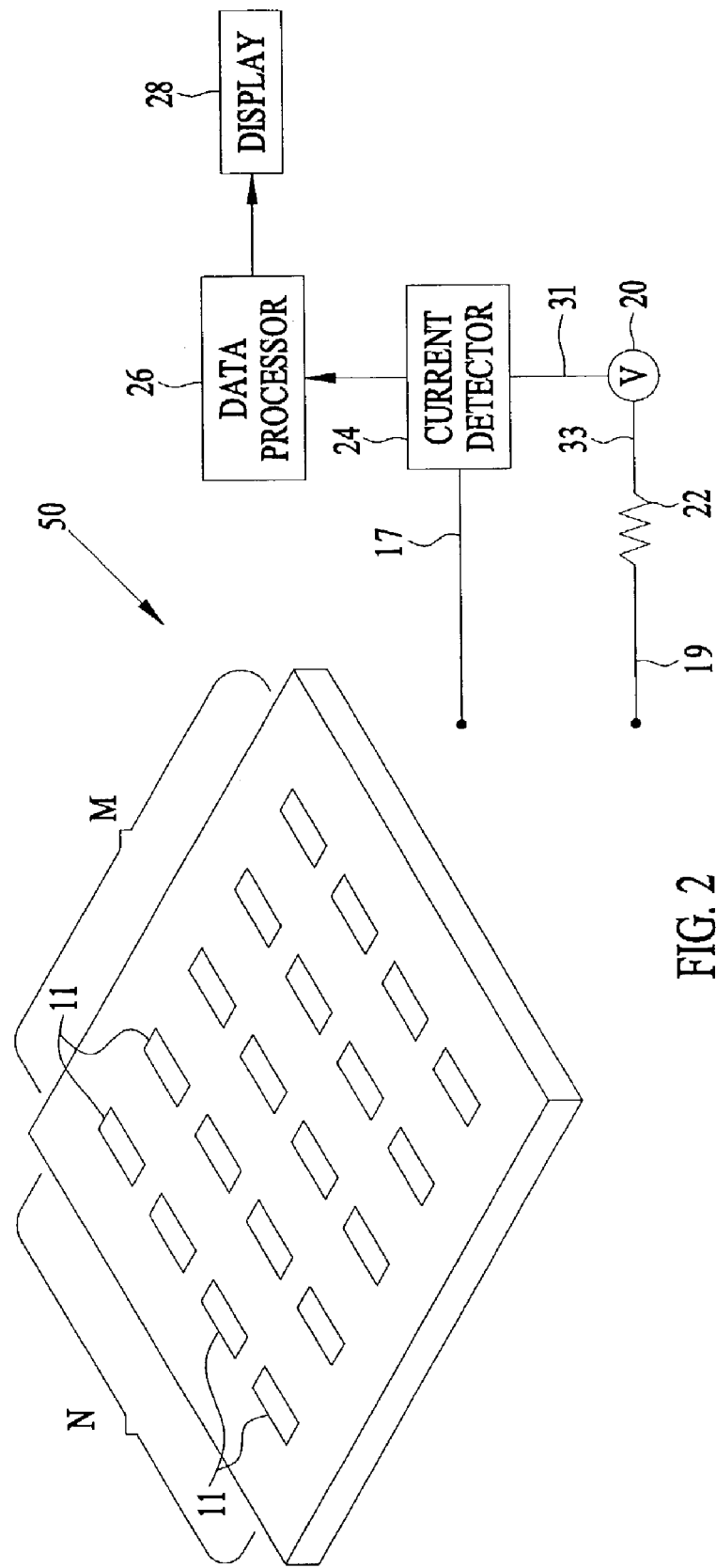
FIG. 2 shows multiple neutron detectors configured into an array.

In another embodiment of a solid-state thermal neutron detector, layered structures 11 may be configured into an array to provide the detector with a larger aperture. In FIG. 2 there is shown an example of a solid-state thermal neutron detector 50 that includes an M×N array of layered structures 11 for detecting neutrons, where M and N are positive integers. In FIG. 2, for purposes of illustration, and by way of example only, M=5 and N=4. However it is to be understood that M and N may each have values other than as illustrated and described above. Moreover, layered structures 11 may be organized into arrays having other than rectangular configurations. For example, layered structures 11 may be configured into circular arrays, or other array patterns, depending upon the requirements of a particular application. Each of layered structures 11 is electrically connected in parallel with voltage source 20 and current detector 24 with electrical leads 17 and 19. Thus, current detector 24 may be used to indicate when any of layered structures 11 interacts with a neutron.

Figure 4:
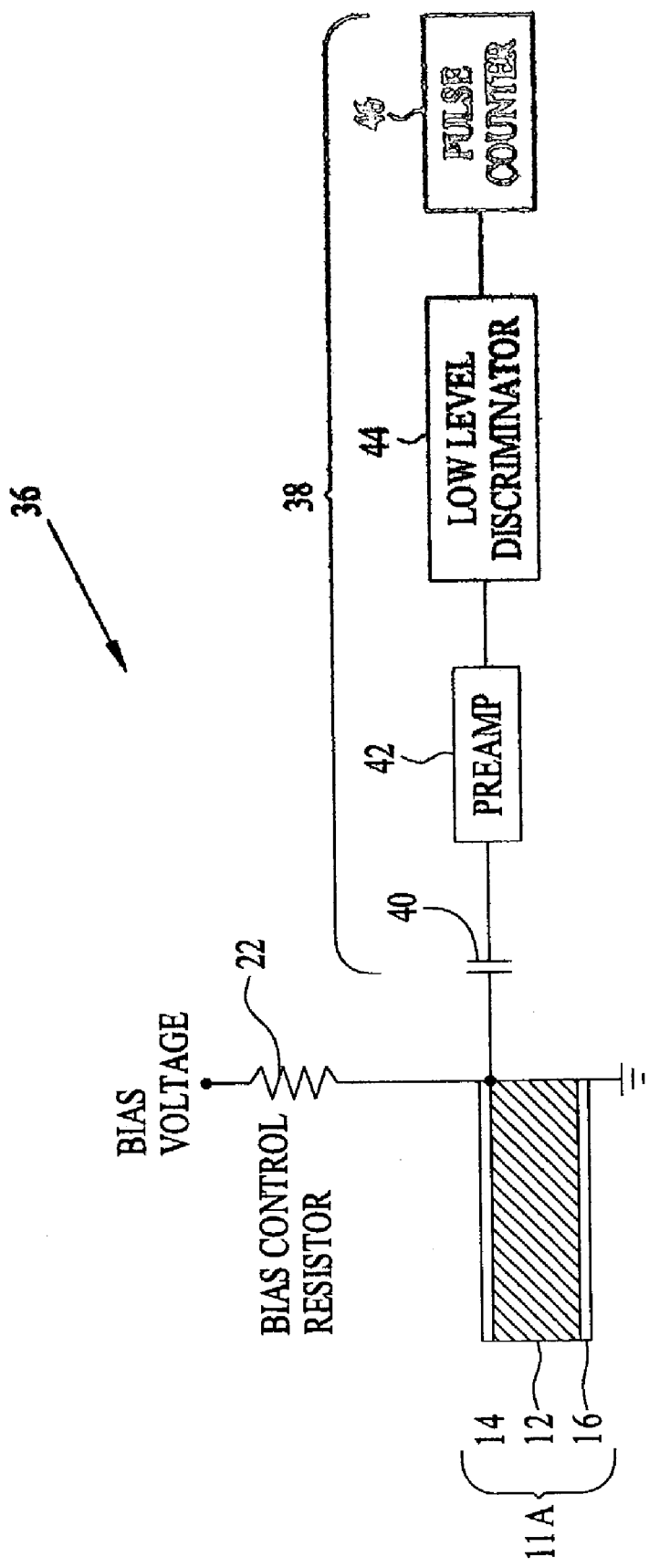
FIG. 4 shows yet another embodiment of a thermal neutron detector.

Referring to FIG. 4, there is shown an embodiment of a thermal neutron detector 36 that includes a layered structure 11A that is electrically coupled to a current detector circuit 38 and a bias control resistor 22. Layered structure 11 includes a first electrode 14 affixed to one side of a neutron-reactive layer 12 and a second electrode 16 affixed to another side of neutron-reactive layer 12. Bias voltage from a voltage source (not shown) is electrically coupled to layered structure 11A through electrode 12, and is grounded through electrode 16. Bias control resistor 22 is used to limit the voltage across layered structure 11A to maintain the background or "dark current" that may otherwise flow through layered structure 11A below a particular level. Electrode 14 is electrically coupled to current detector circuit 38 that includes a capacitor 40, preamp 42, low level discriminator 44, and a pulse counter 46. Capacitor 40 serves to filter out DC voltage associated with background current. Pre-amp 42 provides voltage amplification, and low level discriminator 44 filters out voltage signals that are below a threshold that may be established by a user. Voltage pulses that exceed such threshold are counted by pulse counter 46. Although only one layered structure 11A is shown electrically coupled to current detector circuit 38, it is to be understood that multiple layered structures 11A may be electrically coupled in parallel with current detector circuit 38.

Figure 5:
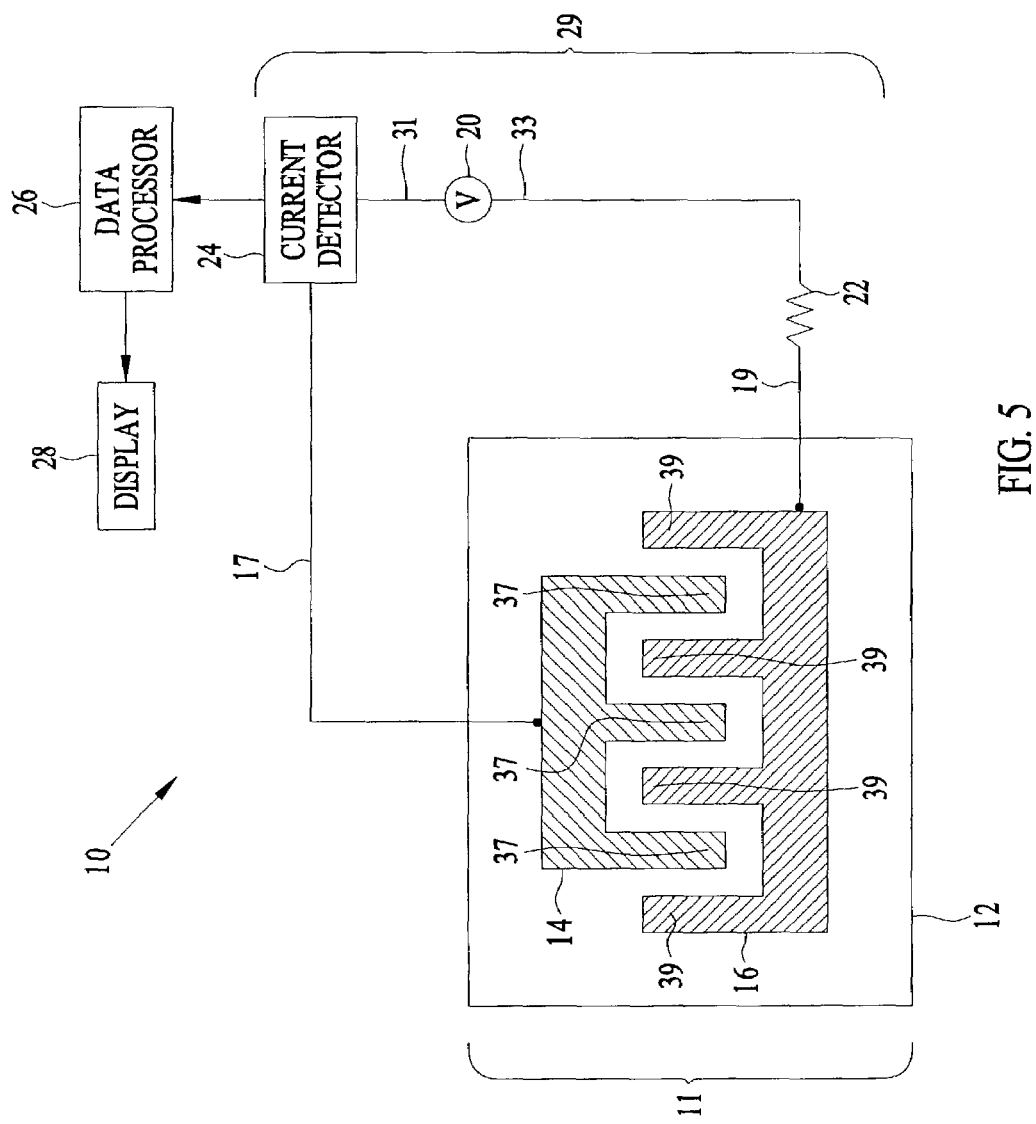
FIG. 5 shows an embodiment of a thermal neutron detector having interdigitized thin film electrodes affixed to a neutron reactive layer.

In another embodiment of thermal neutron detector 10 as shown in FIG. 5, electrodes 14 and 16 may be thin films formed on neutron-reactive layer 12 such that projections 37 of electrode 14 are positioned between projections 39 of electrode 16 so as to define an interdigitized electrode structure. FIG. 5 is a plan view of layered structure 11, where it is to be understood that neutron-reactive layer 12 is affixed to an insulating substrate 18, not shown.

Figure 6:
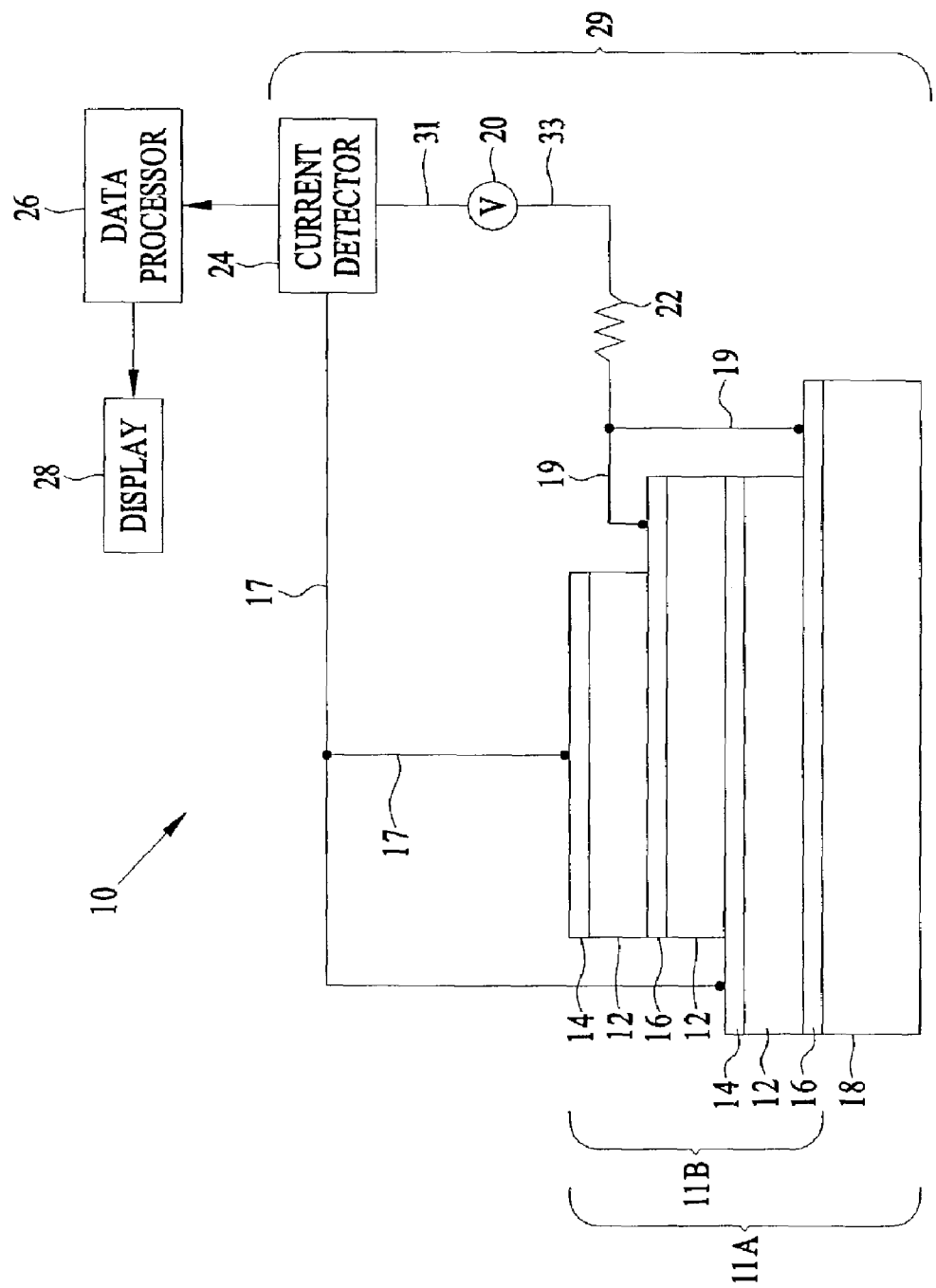
FIG. 6 shows an embodiment of a neutron detector having a multilayered structure.

In another embodiment of thermal neutron detector 10, shown in FIG. 6, layered structure 11 includes a stack 11B affixed to electrically insulating substrate 18. Stack 11B includes alternating layers of electrodes 14 and 16 between which a neutron-reactive layers 12 is interposed. Each of neutron-reactive layers 12 is in ohmic contact with adjoining electrodes 14 and 16. Ohmic contact results from the selection of materials used for electrodes 14 and 16, and for the neutron-reactive layer 12 as described above. By way of example, in FIG. 6, the layers of layered structure 11 may be stacked in the following order: insulating substrate 18, electrode 16, neutron-reactive layer 12, electrode 14, neutron-reactive layer 12, electrode 16, neutron-reactive layer 12, and electrode 14. Layered structure 11 is shown in FIG. 6 to include 3 neutron-reactive layers interposed between electrodes 16 and 16. However, it is to be understood that layered structure 11 may include any number of neutron-reactive layers 12 interposed between electrodes 14 and 16, where each of electrodes 14 are electrically coupled to voltage source 20 via electrical lead 17, and each of electrodes are 16 are coupled to voltage source 20 via electrical lead 19.

Obviously, many modifications and variations of the invention are possible in light of the above teachings. It is therefore to be understood that within the scope of the appended claims, the invention may be practiced otherwise than as specifically described.

We claim:

1. A solid-state thermal neutron detector, comprising:
    a layered structure that includes:
        an electrically insulating substrate;
        a first electrode affixed to said substrate;
        an insulating neutron-reactive layer affixed to and in ohmic contact with said first electrode, wherein said neutron-reactive layer consists essentially of a material selected from the group that includes cubic boron nitride, gadolinium oxide, lithium tantalate, and lithium niobate; and
        a second electrode affixed to and in ohmic contact with said neutron-reactive layer;
    a voltage source electrically coupled to said first and second electrodes; and
    an electrical current detector electrically coupled in series between said layered structure and said voltage source.

2. The solid-state thermal neutron detector of claim 1 wherein said first and second electrodes consist essentially of a doped neutron-reactive material.

3. The solid-state thermal neutron detector of claim 1 further including a resistor for limiting current conducted through said layered structure.

4. The solid-state thermal neutron detector of claim 3 further including a data processor for storing data received from said current detector that represents said current.

5. The solid-state thermal neutron detector of claim 4 further including a display operably coupled to said data processor for displaying images representing said current.

6. The solid-state thermal neutron detector of claim 1 wherein said neutron-reactive layer consists essentially of a material selected from the group that includes a boron compound, a gadolinium compound, a lithium compound, a cadmium compound, a samarium compound, and a europium compound.

7. The solid-state thermal neutron detector of claim 6 wherein said first and second electrodes consist essentially of a doped neutron-reactive material.

8. The solid-state thermal neutron detector of claim 6 wherein said first and second electrodes consist essentially of a material selected from the group that includes a doped neutron-reactive material, titanium, hafnium, zirconium, titanium nitride, hafnium nitride, and zirconium nitride and combinations thereof.

9. The solid-state thermal neutron detector of claim 1 wherein said first and second electrodes consist essentially of a material selected from the group that includes titanium, hafnium, and zirconium.

10. The solid-state thermal neutron detector of claim 1 wherein said first and second electrodes consist essentially of a material selected from the group that includes titanium nitride, hafnium nitride, and zirconium nitride.

11. The solid-state thermal neutron detector of claim 1 wherein said first and second electrodes consist essentially of a material selected from the group that includes a doped neutron-reactive material, titanium, hafnium, zirconium, titanium nitride, hafnium nitride, and zirconium nitride and combinations thereof.

12. The solid-state thermal neutron detector of claim 1, wherein the group further includes hexagonal boron nitride.

13. The solid-state thermal neutron detector of claim 12 wherein said first and second electrodes consist essentially of a materialselected from the group that includes a doped neutron-reactive material, titanium, hafnium, zirconium, titanium nitride, hafnium nitride, and zirconium nitride and combinations thereof.

14. A solid-state thermal neutron detector, comprising:
an array of layered structures, where each layered structure includes:
an electrically insulating substrate;
a first electrode affixed to said substrate;
an insulating neutron-reactive layer affixed to and in ohmic contact with said first electrode, wherein said neutron-reactive layer consists essentially of a material selected from the group that includes cubic boron nitride, gadolinium oxide, lithium tantalate, and lithium niobate; and
a second electrode affixed to and in ohmic contact with said neutron-reactive layer;
a voltage source electrically coupled to said first and second electrodes of each of said layered structures; and
an electrical current detector electrically coupled in series between each of said layered structures and said voltage source.

15. The solid-state thermal neutron detector of claim 14 wherein said neutron-reactive layer consists essentially of a material selected from the group that includes a boron compound, a gadolinium compound, a lithium compound, a cadmium compound, a samarium compound, and a europium compound.

16. The solid-state thermal neutron detector of claim 14 wherein said first and second electrodes consist essentially of a doped neutron-reactive material.

17. The solid-state thermal neutron detector of claim 14 wherein said first and second electrodes consist essentially of a material selected from the group that includes titanium, hafnium, and zirconium.

18. The solid-state thermal neutron detector of claim 14 wherein said first and second electrodes consist essentially of a material selected from the group that includes titanium nitride, hafnium nitride, and zirconium nitride.

19. The solid-state thermal neutron detector of claim 14 wherein said first and second electrodes consist essentially of a material selected from the group that includes a doped neutron-reactive material, titanium, hafnium, zirconium, titanium nitride, hafnium nitride, and zirconium nitride and combinations thereof.

20. The solid-state thermal neutron detector of claim 14, wherein the group further includes hexagonal boron nitride.

21. The solid-state thermal neutron detector of claim 20 wherein said first and second electrodes consist essentially of a material selected from the group that includes a doped neutron-reactive material, titanium, hafnium, zirconium, titanium nitride, hafnium nitride, and zirconium nitride and combinations thereof.

22. A solid-state thermal neutron detector, comprising:
a layered structure that includes;
an electrically insulating substrate;
an insulating neutron-reactive layer affixed to said electrically insulating substrate, wherein said neutron-reactive layer consists essentially of a material selected from the group that includes cubic boron nitride, gadolinium oxide, lithium tantalate, and lithium niobate; and
first and second interdigitized electrodes affixed to and in ohmic contact with said neutron-reactive layer substrate;
a voltage source electrically coupled to said first and second electrodes; and
an electrical current detector electrically coupled between said layered structure and said voltage source.

23. The solid-state thermal neutron detector of claim 22 wherein said first and second electrodes consist essentially of a doped neutron-reactive material.

24. The solid-state thermal neutron detector of claim 22 wherein said first and second electrodes consist essentially of a material selected from the group that includes titanium, hafnium, and zirconium.

25. The solid-state thermal neutron detector of claim 22 wherein said first and second electrodes consist essentially of a material selected from the group that includes titanium nitride, hafnium nitride, and zirconium nitride.

26. The solid-state thermal neutron detector of claim 22 wherein said first and second electrodes consist essentially of a material selected from the group that includes a doped neutron-reactive material, titanium, hafnium, zirconium, titanium nitride, hafnium nitride, and zirconium nitride and combinations thereof.

27. The solid-state thermal neutron detector of claim 22, wherein the group further includes hexagonal boron nitride.

28. The solid-state thermal neutron detector of claim 27 wherein said first and second electrodes consist essentially of a material selected from the group that includes a doped neutron-reactive material, titanium, hafnium, zirconium, titanium nitride, hafnium nitride, and zirconium nitride and combinations thereof.

29. A solid-state thermal neutron detector, comprising:
a layered structure that includes:
an electrically insulating substrate; and
a stack affixed to said insulating substrate that includes an alternating series of electrodes and insulating neutron-reactive layers in ohmic contact with said electrodes, wherein said neutron-reactive layers consist essentially of a material selected from the group that includes cubic boron nitride, gadolinium oxide, lithium tantalate, and lithium niobate;
a voltage source electrically coupled to said electrodes; and
an electrical current detector electrically coupled in series between said layered structure and said voltage source.

30. The solid-state thermal neutron detector of claim 29 wherein said electrodes consist essentially of a doped neutron-reactive material.

31. The solid-state thermal neutron detector of claim 29 wherein said first and second electrodes consist essentially of a material selected from the group that includes titanium, hafnium, and zirconium.

32. The solid-state thermal neutron detector of claim 29 wherein said first and second electrodes consist essentially of a material selected from the group that includes titanium nitride, hafnium nitride, and zirconium nitride.

33. The solid-state thermal neutron detector of claim 29 wherein said first and second electrodes consist essentially of a material selected from the group that includes a doped neutron-reactive material, titanium, hafnium, zirconium, titanium nitride, hafnium nitride, and zirconium nitride and combinations thereof.

34. The solid-state thermal neutron detector of claim 29, wherein the group further includes hexagonal boron nitride.

35. The solid-state thermal neutron detector of claim 34 wherein said first and second electrodes consist essentially of a material selected from the group that includes a doped neutron-reactive material, titanium, hafnium, zirconium, titanium nitride, hafnium nitride, and zirconium nitride and combinations thereof.

* * * * *